United States Patent
Abraham et al.

(10) Patent No.: US 12,245,067 B2
(45) Date of Patent: Mar. 4, 2025

(54) SYSTEM AND METHOD FOR EXCHANGING DATA BETWEEN A SHIP TERMINAL AND A SHORE TERMINAL

(71) Applicant: IBS Software FZ-LLC, Dubai (AE)

(72) Inventors: Anil Abraham, Kerala (IN); Rejeesh A R, Kerala (IN); Ajish Thankachan, Kerala (IN); Sibu K Sebastian, Kerala (IN)

(73) Assignee: IBS Software FZ-LLC, Dubai (AE)

( * ) Notice: Subject to any disclaimer, the term of this patent is extended or adjusted under 35 U.S.C. 154(b) by 323 days.

(21) Appl. No.: 18/052,227

(22) Filed: Nov. 3, 2022

(65) Prior Publication Data

US 2024/0155410 A1    May 9, 2024

(51) Int. Cl.
*H04W 28/02*      (2009.01)
*H04W 28/08*      (2023.01)
*H04W 28/18*      (2009.01)

(52) U.S. Cl.
CPC ....... *H04W 28/0226* (2013.01); *H04W 28/09* (2020.05); *H04W 28/18* (2013.01)

(58) Field of Classification Search
CPC .. H04W 28/0226; H04W 28/09; H04W 28/18
See application file for complete search history.

(56) References Cited

U.S. PATENT DOCUMENTS

| | | | |
|---|---|---|---|
| 2005/0248454 A1* | 11/2005 | Hanson | H04Q 9/00 340/539.22 |
| 2006/0178142 A1* | 8/2006 | Lovberg | H04B 1/38 455/431 |
| 2017/0207976 A1* | 7/2017 | Rovner | H04L 43/16 |

FOREIGN PATENT DOCUMENTS

| | | |
|---|---|---|
| CN | 104678914 A | 6/2015 |
| CN | 112333425 A | 2/2021 |
| CN | 112437107 A | 3/2021 |
| KR | 20170031493 A | 3/2017 |
| KR | 102066272 B1 | 1/2020 |

* cited by examiner

*Primary Examiner* — Khoa Huynh (57) ABSTRACT

A system and method for exchanging data between a shore terminal and one or more ship terminals is illustrated. For this purpose, one or more data partitions are maintained in a message store at the shore terminal, wherein each data partition corresponds to a ship terminal from the one or more ship terminals. Further, one or more packets are received from enterprise applications running at the shore terminal. Packet comprises a payload and a meta-information, wherein the payload corresponds to data which is to be exchanged and the meta-information corresponds to an address associated with destination. Meta-information is used to store the received packets to their corresponding data partitions. Further, on establishing a stable network connection between the target ship and the message store, the payload is then transmitted from the data partitions at the message store to their corresponding destination.

28 Claims, 4 Drawing Sheets

SYSTEM AND METHOD FOR EXCHANGING DATA BETWEEN A SHIP TERMINAL AND A SHORE TERMINAL

CROSS-REFERENCE TO RELATED APPLICATIONS AND PRIORITY

The present application does not claim priority from any other patent application.

TECHNICAL FIELD

The present subject matter described herein, in general, relates to a system and a method for seamless data communication between a set of enterprise applications. More specifically, the present subject matter discloses the system and method for seamless exchange of data between enterprise applications hosted on a set of ships, and the enterprise applications deployed at a centralized shore terminal.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The shipping, logistics and freight forwarding industries are operated based on old and fragmented manual and automated systems. This entails a large amount of paperwork, phone calls, and back and forth communication among the parties involved. Furthermore, the records from various stakeholders are prone to integrity and accuracy constraints.

With the rapid development of the Internet connectivity, traditional industries are changing their original working methods. However, the traditional maritime industry has undergone very less changes. This is because the communication methods for establishing communication between shipping vessels at sea are very different from those on land, mainly using mobile signals and satellite signals. The mobile signal at sea is very unstable and the price is high.

To address this backdrop, the concept of 'e-Navigation', the next-generation marine safety management system, developed and introduced by the International Maritime Organization (IMO) to improve safety and security of commercial shipping operations by facilitating better communication and organization of data between ships and shore-based facilities. However, lack of continuous internet connectivity between the ships and the shore-based facilities is still an active concern for the Maritime industry.

The lack of continuous network connectivity between the ships and the shore-based facilities, during an active voyage, force many cruise line service providers to host their business applications independently on the ship. This has resulted in isolation and duplication of customer data in segregated environments, which at later stage needs to be synced with central environment for consolidation. Currently, data transfer or synchronization is mainly handled via bulk data exports/imports, which are mostly people dependent, error prone and delayed in nature. Additionally, there is a challenge of disparate data format to be handled for multiple enterprises applications.

Hosting independent applications on shipside or on shoreside has made data analysis, revenue accounting and centralized governance difficult to execute. This also put restrictions on cruise lines in extending onboard business offerings prior to journey. For example, since the dining systems are hosted on the ships, it is difficult for the cruise lines to offer reservation of a specialty restaurant or dining slot based on the real-time availability.

As known in the art, there are existing systems for transmission of information from ship environment to a shore side centralized server over a communication network. However, such systems also suffers from the intermittent loss of connectivity between the ships and the shore-based facilities and lacking in the real time sharing of information across the facilities in the ongoing journey.

Thus, there is a long-felt need for a business agnostic data transfer framework which provides real-time automated data transfer, with built in fault tolerance for network glitches.

SUMMARY

This summary is provided to introduce concepts related to a framework for seamless exchange of data between enterprise applications hosted on ships and its shore counterparts, and the concepts are further described below in the detailed description. This summary is not intended to identify essential features of the claimed subject matter nor is it intended for use in determining or limiting the scope of the claimed subject matter.

In one embodiment, a system of exchanging data between a shore terminal and ship terminal is disclosed. The system may either be a part of the shore terminal or may be a part of the ship terminal or may be distributed in-part across the shore terminal and the ship terminal. Further, the system is used for data exchange between the same or disparate applications, and it is up to the applications to decide whether it is used for data synchronization or data exchange between the applications hosted on ships and its shore counterparts. Further, the connectivity constraints may restrict the applications hosted on the ship terminal to have direct API connectivity to applications hosted on the shore terminal. Further, the system provides direct API-like experience to the applications with its business agnostic data exchange mechanisms. Conventionally, if the applications were directly using a messaging system for data exchange, both the sender application and receiver application have to integrate with the messaging server and there will be changes in both the systems even if the receiver applications have standard APIs for receiving the data. Further, the source application calls the API of receiving application. The system may result in eliminating complexities and enables faster integrations between the applications through standard APIs.

In one implementation of the present disclosure, a system (101) for transferring data from a shore terminal (102) to one or more ship terminals (103) is disclosed. The system (101) may comprises a memory (203), a processor (201) coupled to the memory (203), wherein the processor (201) is configured to execute program instructions, stored in the memory (203), wherein the program instructions are corresponding to modules (205), wherein the modules (205) comprise a shore data routing module (202) and a ship data routing module (204), wherein a messaging server (105) is hosted on the shore terminal (102), wherein the messaging server (105) comprises a message store (106), wherein the message store (106) comprises an outbound message store (305) and an inbound message store (405). The processor (201) may be configured to execute program instructions, stored in the memory (203), corresponding to the messaging server (105), implemented at the shore terminal (102) for maintaining one or more data partitions (302) in the outbound message store (305), wherein each data partition corresponds to a ship terminal from the one or more ship terminals (103). The processor (201) is further configured to execute program instructions, stored in the memory (203), corresponding to the shore data routing module (202), implemented at the shore terminal (102) for receiving one or more packets from one or more enterprise applications (301) running at the shore terminal (102), wherein each packet, from the one or more packets, comprises a payload and a meta-information, wherein the payload corresponds to data which is to be transferred to a target ship terminal (103-T), wherein the meta-information corresponds to an address of the target ship terminal (103-T) from the one or more ship terminals (103), to which the payload is to be transmitted. The processor (201) is further configured to execute program instructions, stored in the memory (203), corresponding to the shore data routing module (202), implemented at the shore terminal (102) for identifying a target data partition (302-T), from the one or more data partitions (302), corresponding to each packet from the one or more packets, based on the meta-information corresponding to each packet from the one or more packets and storing each packet to the target data partition (302-T) associated with the packet, in the outbound message store (305). The processor (201) is further configured to execute program instructions, stored in the memory (203), corresponding to the ship data routing module (204), implemented at the target ship terminal (103-T) for monitoring a network connection between the target ship terminal (103-T) and the outbound message store (305) and identifying the target data partition (302-T), from the one or data partitions (302), associated with the target ship terminal (103-T), when a stable network connection is established between the target ship terminal (103-T) and the outbound message store (305). The processor (201) is further configured to execute program instructions, stored in the memory (203), corresponding to the ship data routing module (204), implemented at the target ship terminal (103-T) for identifying a target enterprise application (303-T), from the one or more target enterprise applications (303), running on the target ship terminal (103-T), based on the meta-information associated with each packet stored in the target data partition (302-T) and transmitting the payload associated with each packet, stored in the target data partition (302-T), to the target enterprise application (303-T) running on the target ship terminal (103-T).

Figure 3:
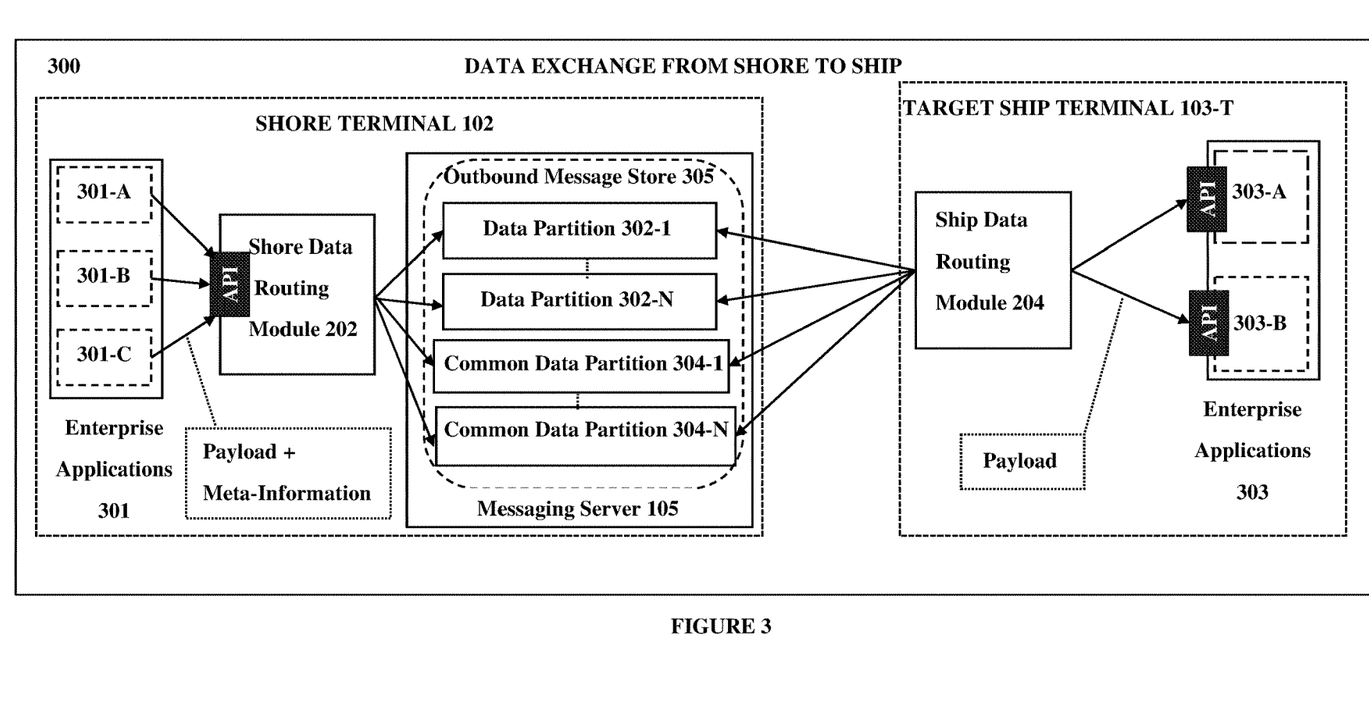
FIG. 3 illustrates a data flow representation 300 in the event of data exchange from a shore terminal to a target ship terminal, in accordance with an embodiment of the present disclosure.

In another implementation of the present disclosure, a method for transferring data from a shore terminal (102) to one or more ship terminals (103) is disclosed. The method comprise step of maintaining one or more data partitions (302) in an outbound message store (305), wherein each data partition corresponds to a ship terminal from the one or more ship terminals (103). The method may further comprise step of receiving one or more packets from one or more enterprise applications (301) running at the shore terminal (302), wherein each packet, from the one or more packets, comprises a payload and a meta-information, wherein the payload corresponds to data which is to be transferred to a target ship terminal (103-T), wherein the meta-information corresponds to an address of the target ship terminal (103-T), from the one or more ship terminals (103), to which the payload is to be transmitted. The method may further comprise step of identifying a target data partition (302-T), from the one or more data partitions (302), corresponding to each packet from the one or more packets, based on the meta-information corresponding to each packet from the one or more packets and storing each packet to the target data partition (302-T) associated with the packet, in the outbound message store (305). Further the method may comprise step of monitoring a network connection between the target ship terminal (103-T) and the outbound message store (305) and identifying the target data partition (302-T), from the one or data partitions (302), associated with the target ship terminal (103-T), when a stable network connection is established between the target ship terminal (103-T) and the outbound message store (305). Further the method may comprise step of transmitting the payload associated with each packet, stored in the target data partition (302-T), to the target enterprise application (303-T), running on the target ship terminal (103-T).

In one implementation of the present disclosure, a system (101) for transferring data from a source ship terminal (103-S) to a shore terminal (102) is disclosed. The system may comprises a memory (203) and a processor (201) coupled to the memory (203), wherein the processor (201) is configured to execute program instructions stored in the memory (203), wherein the program instructions are corresponding to modules (205), wherein the modules (205) comprise a shore data routing module (202) and a ship data routing module (204), wherein a messaging server (105) hosted on the shore terminal (102), wherein the messaging server (105) comprises a message store (106), wherein the message store (106) comprise an outbound message store (305) and an inbound message store (405). The processor (201) configured to execute program instructions, stored in the memory (203), corresponding to the messaging server (105), implemented at the shore terminal (102) for maintaining one or more common data partitions (404) in the inbound message store (405). The processor (201) configured to execute program instructions, stored in the memory (203), corresponding to the ship data routing module (204), implemented at the source ship terminal (103-S) for receiving one or more data packets from one or more enterprise applications (403) running at the source ship terminal (103-S), wherein each data packet, from the one or more data packets, comprises a payload and a meta-information, wherein the payload corresponds to data which is to be transferred to the shore terminal (102), wherein the meta-information corresponds to address of one or more target enterprise applications (401) running at the shore terminal (102), to which payload is to be transmitted. The processor (201) configured to execute program instructions, stored in the memory (203), corresponding to the ship data routing module (204), implemented at the source ship terminal (103-S) for monitoring a network connection between the source ship terminal (103-S) and the inbound message store (405), hosted at the shore terminal (102) and storing the one or more data packets, to the one or more common data partitions (404) in the inbound message store (405), when the network connection between the source ship terminal (103-S) and the inbound message store (405) is stable. The processor (201) configured to execute program instructions, stored in the memory (203), corresponding to the shore data routing module (202), implemented at the shore terminal (102) for identifying a designated common data partition (404-D) from the one or more common data partitions (404), corresponding to each data packet, from the one or more data packets and identifying a target enterprise application (401-T) from the one or more target enterprise applications (401), corresponding to each data packet, from the one or more data packets, based on meta-information associated with each packet from the one or more data packets. The processor (201) configured to execute program instructions, stored in the memory (203), corresponding to the shore data routing module (202), implemented at the shore terminal (102) for transmitting, from the designated common data partition (404-D), the payload associated with each data packet from the one or more data packets to the target enterprise application (401-T) running at the shore terminal (102).

Figure 4:
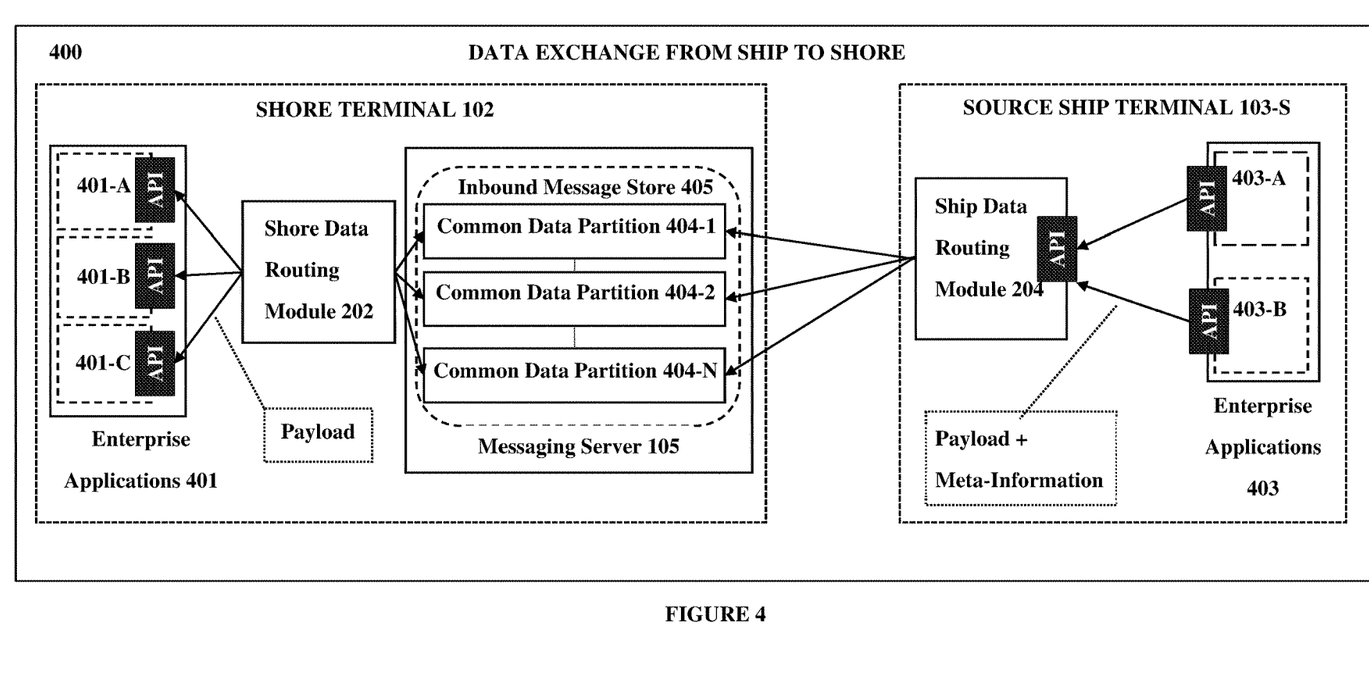
FIG. 4 illustrates a data flow representation 400 in the event of data exchange from a source ship terminal to the shore terminal, in accordance with an embodiment of the present disclosure.

In another embodiment of the present disclosure, a method for transferring data from a source ship terminal (103-S) to a shore terminal (102) is disclosed. The method may comprise step of maintaining one or more common data partitions (404) in an inbound message store (405) and receiving one or more data packets from one or more enterprise applications (403) running at the source ship terminal (103-S), wherein each data packet, from the one or more data packets, comprises a payload and a meta-information, wherein the payload corresponds to data which is to be transferred to the shore terminal (102), wherein the meta-information corresponds to address of one or more target enterprise applications (401) running at the shore terminal (102), to which payload is to be transmitted. The method may comprise step of monitoring a network connection between the source ship terminal (103-S) and the inbound message store (405), hosted at the shore terminal (102) and storing the one or more data packets, to the one or more common data partitions (404) in the inbound message store (405), when the network connection between the source ship terminal (103-S) and the inbound message store (405) is stable. The method may further comprise step of identifying a designated common data partition (404-D) from the one or more common data partitions (404), corresponding to each data packet from the one or more data packets and identifying a target enterprise application (401-T), from the one or more target enterprise applications (401), corresponding to each data packet, from the one or more data packets, based on meta-information associated with each packet from the one or more data packets. Further, the method may comprise steps of transmitting, from the designated common data partition (404-D), the payload associated with each data packet from the one or more data packets to the target enterprise application (401-T) running at the shore terminal (102).

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments. Following is an example which is illustrative only and invention accommodates any and every variation of the example provided below that shall serve the same purpose and is obvious to a person skilled in the art.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are described. The disclosed embodiments are merely exemplary of the disclosure, which may be embodied in various forms.

The present disclosure relates to a framework for seamless exchange of data between a shore terminal and one or more ship terminals. In one embodiment, the exchange of data may correspond to transferring data from the shore terminal to the one or more ship terminals. In another embodiment, the exchange of data may correspond to transferring data from a ship terminal, from the one or more ship terminals to the shore terminal.

Figure 1:
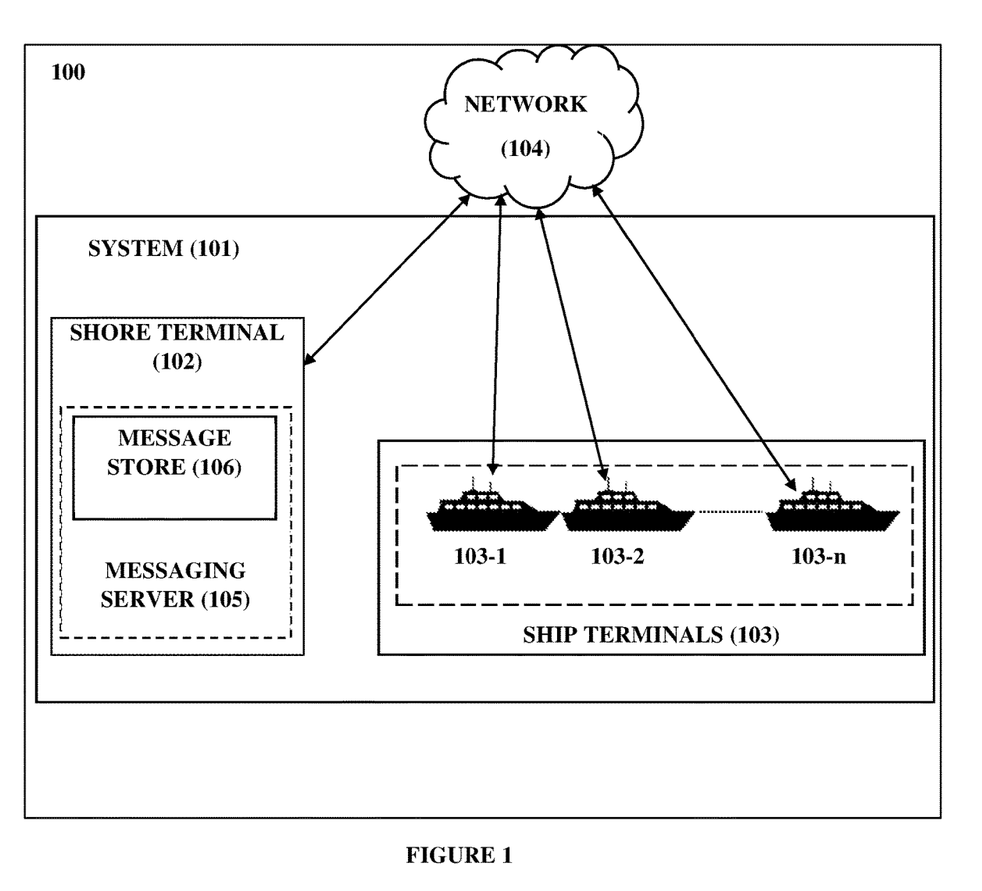
FIG. 1 illustrates a network implementation 100 of a system 101 for seamless exchange of data between a shore terminal and one or more ship terminals, in accordance with an embodiment of the present disclosure.

Referring to FIG. 1, a network implementation 100 of a system 101 for seamless exchange of data between a shore terminal 102 and one or more ship terminals 103-1, 103-2, ..., 103-n collectively referred to as a ship terminal 103, is illustrated, in accordance with an embodiment of the present subject matter. In one embodiment, the system 101 may comprise a processor and a memory. Further, the system 101 may be connected to the shore terminal 102 and one or more ship terminals (hereinafter, interchangeably, ship terminal 103) through a network 104. Further, a messaging server 105 hosted on the shore terminal 102, wherein the messaging server may comprise a message store 106.

In one embodiment, the system 101 may either be a part of the shore terminal 102 or may be a part of the ship terminal 103 or may be distributed in-part across the shore terminal 102 and the ship terminal 103. It must be noted that the system 101 may also be a separate intermediate entity distinct than the shore terminal 102 and the ship terminal 103.

The system 101 can be implemented using hardware, software, or a combination of both, including using where suitable, one or more computer programs, mobile applications or "apps" by deploying either on-premises over the corresponding computing terminals or virtually over cloud infrastructure. The system 101 may comprises various micro-services or groups of independent computer programs which can act independently in collaboration with other micro-services. The system 101 may also interacts with a third-party or external computer systems. Internally, the system 101 may be the central processor of all requests for transactions by the various actors or users of the system. A critical attribute of the system 101 is that it is able to concurrently and instantly complete an online transaction by a system user in collaboration with other systems.

In one embodiment, the shore terminal 102 may comprises one or more facilities build on any one of the following: shore, coastline, beach, strand, harbours, marina, bank, land, port, dockyard, boatyard, dock, haven, and others.

In one embodiment, a ship from the one or more ship terminal 103 may comprising any one of the following: watercraft (e.g., boats, ships, hovercraft, submarines, speedboats, tugboats, barges, etc.), water vessel, waterborne vessels, yacht, Cabin cruiser, brig, sailboat, ferry, trawler, windsurfer, jet ski boat, airboat, kayak, coble, inflatable boat, raft, banana boat, pontoon, narrowboat, dredgers, large-sized vessels such as cruise ships, oil tankers, drill ships, container cargo ships and others.

In one embodiment, the network 104 may comprising any one of the following: a cable network, a wireless network, a telephone network (e.g., Analog, Digital, POTS, PSTN, ISDN, xDSL), a cellular communication network, a mobile telephone network (e.g., CDMA, GSM, NDAC, TDMA, E-TDMA, NAMPS, WCDMA, CDMA-2000, UMTS, 3G, 4G, 5G, 6G), a radio network, a television network, an Internet, an intranet, a local area network (LAN), a wide area network (WAN), an electronic positioning network, an X.25 network, an optical network (e.g., PON), a satellite network (e.g., VSAT), a packet-switched network, a circuit-switched network, a public network, a private network, and/or other wired or wireless communications network configured to carry data. The aforementioned network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

Figure 2:
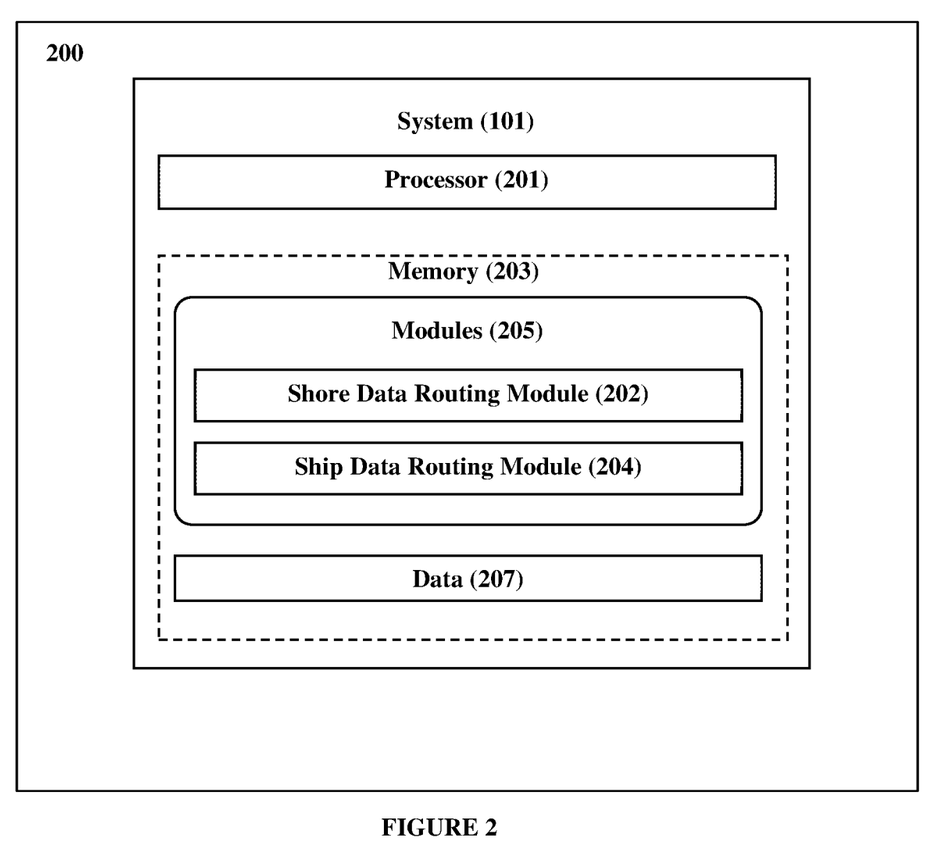
FIG. 2 illustrates a block diagram 200 of the system 101, in accordance with an embodiment of the present disclosure.

Referring now to FIG. 2, block diagram 200 comprising various components of the system 101 is illustrated, in accordance with an embodiment of the present subject matter. As shown, the system 101 may include at least one processor 201 and a memory 203. The memory 203 may comprises a set of modules 205 and a data 207. The set of modules may include a Shore Data Routing module 202, and a Ship Data Routing module 204. The data 207 amongst other things, serves as a repository for storing data processed, received, and generated by one or more components and programmed instructions.

In one embodiment, the at least one processor 201 is configured to fetch and execute programmed instructions, stored in the memory 203, corresponding to each module.

In one embodiment, the processor 201 may be configured to execute programmed instructions corresponding to the Shore Data Routing module 202. In another embodiment, the processor 201 may be configured to execute programmed instructions corresponding to the Ship Data Routing Module 204. In one embodiment, the programmed instructions may include routines, programs, objects, components, data structures, etc., which perform particular tasks, functions, or implement particular abstract data types.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, memory cards and cloud storage.

Further, the working of the system 101 will now be described in detail referring to FIGS. 1 and 2.

In one embodiment, the processor 201 may be configured to execute programmed instructions stored in the memory for transferring data from the shore terminal 102 to the one or more ship terminals 103. For this purpose, the messaging server 105, hosted at the shore terminal 102, maintains one or more data partitions in an outbound message store 305, as illustrated in FIG. 3. Each data partition may correspond to a ship terminal from the one or more ship terminals 103. Additionally, the messaging server 105 may further be configured to maintain one or more common data partitions in the outbound message store 305, as illustrated in FIG. 3.

Further, the Shore Data Routing module 202 may be configured for receiving one or more data packets from one or more enterprise applications 301 running at the shore terminal 102. It must be noted that the one or more data packets are received from the one or more enterprise applications 301 through a data transfer Application Programming Interface (API) associated with the Shore Data Routing module 202. Furthermore, each data packet, from the one or more data packets, may comprise a payload and a meta-information. The payload may correspond to data which is to be transferred to a target ship terminal 103-T from the one or more ship terminal 103. The payload, in the received data packets, may corresponds to actual business data which is to be transferred to the target ship terminal 103-T. The meta-information may correspond to an address of the target ship terminal 103-T, from the one or more ship terminals 103, to which the payload is to be transmitted. Further, the meta-information may correspond to an address information related to a destination endpoint to which the data is to be finally transferred. More specifically, address information related to the destination endpoint may correspond to an address information of the target ship terminal 103-T. More specifically, the address information related to the destination endpoint may correspond to address/port information related to one or more target enterprise applications 303-T (not illustrated) running at the target ship terminal 103-T. Further, the meta-information may correspond to details which decides whether the data packets need to be processed sequentially or not.

Further, the Shore Data Routing module 202 may be configured for receiving one or more common data packets from the one or more enterprise applications 301 running at the shore terminal 102. Each common data packet from the one or more common data packets may correspond to two or more ship terminals, from the one or more ship terminals 103, to which the common data packet is to be transferred. The one or more common data partitions 304 maintained in the outbound message store 305, are configured to store the one or more common data packets.

Further, the Shore Data Routing module 202 may be configured for identifying a target data partition 302-T, from the one or more data partitions 302 maintained in the outbound message store 305, corresponding to each data packet from the one or more data packets, based on the meta-information corresponding to each data packet from the one or more data packets.

Further, the Shore Data Routing module 202 may be configured for storing each data packet to the target data partition 302-T associated with the data packet, in the outbound message store 305. The process for transferring data from the shore terminal 102 to the one or more ship terminals 103 is further elaborated in the description provided with respect to FIG. 3.

In another embodiment, the processor 201 may be configured to execute programmed instructions stored in the memory for transferring data from the one or more ship terminals 103 to the shore terminal 102. For this purpose, the messaging server 105, hosted at the shore terminal 102, maintains one or more common data partitions 404 in an inbound message store 405, as illustrated in FIG. 4. In alternative embodiment, the messaging server 105, hosted at the shore terminal 102, may further be configured to maintain one or more data partitions (not illustrated) in the inbound message store 405. Each data partition from the one or more data partitions may correspond to a ship terminal from the one or more ship terminals 103.

Further, the Ship Data Routing module 204 may be configured for receiving one or more data packets from one or more enterprise applications running at a source ship terminal 103-S. It must be noted that the one or more data packets are received from the one or more enterprise applications 403 through a data transfer Application Programming Interface (API) associated with the Ship Data Routing module 204. Additionally, the one or more data packets are received from the one or more enterprise applications 403 through one or more business Application Programming Interface (APIs). Each business API, from the one or more business APIs, may correspond to an enterprise application from the one or more enterprise applications 403, running at the source ship terminal 103-S.

Furthermore, each data packet, from the one or more data packets, may comprise a payload and a meta-information. The payload may correspond to data which is to be transferred to the shore terminal 102. The payload, in the received data packets, may corresponds to actual business-related data which is to be transferred to the shore terminal 102. The meta-information, in the received packets, may correspond to an address information related to a destination endpoint to which the data is to be finally transferred. More specifically, address information related to the destination endpoint may correspond to an address information of the shore terminal 102. Further, the meta-information may correspond to an address of one or more target enterprise applications 401 running at the shore terminal 102, to which payload is to be transmitted. More specifically, the address of one or more target enterprise applications 401 may correspond to address/port information related to one or more target enterprise applications 401 running at the shore terminal 102. Further, the meta-information may correspond to details which decides whether the data packets need to be processed sequentially or not. Furthermore, it must be noted that the Ship Data Routing module 204 may also configured to maintain a buffer datastore (not illustrated) at the source ship terminal 103-S. The buffer datastore is configured to temporarily store the one or more data packets received from the one or more enterprise applications 403, running at the source ship terminal 103-S.

Further, the Ship Data Routing module 204 may be configured for monitoring a network connection between the source ship terminal 103-S and the inbound message store 405 hosted at the shore terminal 102.

Further, the Ship Data Routing module 204 may be configured for identifying a target common data partition 404-T from the one or more common data partitions 404, maintained in the inbound message store 405, corresponding to each data packet, from the one or more data packets, when the network connection between the source ship terminal 103-S and the inbound message store 405 is stable. The stable network connection between the source ship terminal 103-S and the inbound message store 405 is monitored by polling the inbound message store 405 in a predefined time interval. The predefined time interval, for an instance, may be in the range of 5 Sec to 5 min and may be configurable to any time duration. Alternatively, the Ship Data Routing module 204 may be configured for identifying a target data partition from the one or more data partitions (not illustrated), maintained in the inbound message store 405, corresponding to each data packet, from the one or more data packets. The target data partition identified from the one or more data partitions may correspond to the source ship terminal 103-S from which the data packet received by the Ship Data Routing module 204.

Further, the Ship Data Routing module 204 may be configured for transferring the one or more data packets, to the target common data partition 404-T, maintained in the inbound message store 405, when the network connection between the source ship terminal 103-S and the inbound message store 405 is stable. Further, in alternative embodiment, the Ship Data Routing module 204 may be configured for storing the one or more data packets, to the one or more ship specific data partitions, maintained in the inbound message store 405. The exemplary embodiments of the exchanging data between the shore terminal and the one or more ship terminals are now explained with reference to FIGS. 3 and 4.

Now referring to FIG. 3, a data flow representation in the event of data exchange from a shore terminal 102 to the target ship terminal 103-T, is illustrated in accordance with an embodiment of the present disclosure. In one embodiment, one or more enterprise applications 301-A, 301-B, 301-C collectively referred to as Enterprise application 301 running at the shore terminal 102, may transfers data packets to the shore data routing module 202, implemented at the shore terminal 102. The data packets may be transferred by calling a data transfer Application Programming Interface (API) associated with the shore data routing module 202.

The data packets may comprise a payload and a meta information. The payload may correspond to actual business data which needs to be exchanged between the enterprise applications 301 of shore terminal 102 and the target ship terminal 103-T. In context of the business relate to cruise line, the payload may comprise Item details like item name, price, description, or more, Sales details like sales amount, currency, sales times, revenue center, or more, Loyalty details like Loyalty number, points to be credited, amount, currency, or more. The meta-information may correspond to information related to a destination endpoint to which the payload is going to be transferred. The information related to the destination endpoint may comprise either address information of the target ship terminal 103-T or address/port information related to one or more enterprise applications 303 running on the target ship terminal 103-T, in the case of shore to ship data exchange. The meta-information may also correspond to Service, to represent what kind of information is exchanged and the destination service endpoints are configured against the same, DataGroupName, if a group name is specified data will be ordered under that group or TimeS tamp, to represent the time of data exchange etc. Further, the meta-information may correspond to details which decides whether the data packets need to be processed sequentially or not. The data packets may also comprise one or more common data packets which may sent to multiple ship terminals.

Further, the outbound message store 305 may be maintained by the messaging Server 105. The outbound messaging store 305 may be configured to maintain one or more data partitions 302-1, 302-2 ... 302-N collectively referred to as data partition 302, corresponding to the one or more ship terminals 103 to which data packets may need to be transferred. The outbound message store 305 may also be configured to maintain one or more common data partitions 304-1, 304-2 ... 304-N collectively referred to as common data partition 304. The one or more common data partitions 304 may be configured to store the one or more common data packets, targeted to send to multiple ship terminals 103. The one or more common data partitions 304 are maintained, in the outbound message store 305 for any one of the managing large volume of data, diversity of data, different types of data, different topic of data or a combination thereof. The common data packets either may be stored in a single common data partition from the one or more common data partitions or may be stored in multiple common data partitions from the one or more common data partitions. The common data packets stored in the multiple common data partitions may either based on any one of the volume of data in the common data packets, diversity in the type of data, diversity in topics of data, and a combination thereof, of the common data packets. In another embodiment, the common data packets may be stored in the multiple common data partitions for achieving any one of the better data segregation, better data manageability, parallel data processing and a combination thereof.

The shore data routing module 202 may be configured to first identify a target data partition 302-T, from the one or more data partitions 302 maintained in the outbound message store 305, based on the meta information associated with the received data packet and then configured to transfer the data packets to the target data partition 302-T in the outbound message store 305. In another way, the data packet intended for a target ship terminal 103-T is then allocated to the respective data partition 302-T, in the outbound message store 305, designated for that target ship terminal 103-T. The shore data routing module 202 may also be configured to transfer the common data packets to the common data partitions 304 maintained at the outbound message store 305. The common data packets are intended to be broadcasted to multiple ship terminals 103.

Further, the Ship Data Routing module 204, implemented at the target ship terminal 103-T, may be configured for monitoring a network connection between the target ship terminal 103-T and the outbound message store 305 hosted at the shore terminal 102.

Further, the Ship Data Routing module 204 may be configured for identifying a designated data partition 302-D from the one or more data partitions 302, maintained in the outbound message store 305, corresponding to the target ship terminal 103-T associated with the ship data routing module 204, when the network connection between the target ship terminal 103-T and the outbound message store 305 is stable. The stable network connection between the target ship terminal 103-T and the outbound message store 305 is monitored by polling the outbound message store 305 in a predefined time interval. The predefined time interval, for an instance, may be in the range of 5 Sec to 5 min and may be configurable to any time duration. The Ship Data Routing module 204 may also be configured for identifying a designated common data partition 304-D from the one or more common data partitions 304, maintained in the outbound message store 305, when the network connection between the target ship terminal 103-T and the outbound message store 305 is stable.

Further, the ship data routing module 204 may be configured to pull the data packet stored in the designated data partition 302-D, from the outbound message store 305. The ship data routing module 204 may also be configured to pull the common data packets from the designated common data partition 304-D, from the outbound message store 305. Furthermore, it must be noted that the ship data routing module 204 may also configured to maintain a buffer datastore (not illustrated) at the target ship terminal 103-T. The buffer datastore is configured to temporarily store the data packets (including common data packets) pulled from the outbound message store 305.

Further, the ship data routing module 204 may be configured to identify a target enterprise application 303-T from the one or more enterprise applications 303-A, 303-B collectively referred to as enterprise applications 303 running at the target ship terminal 103, based on the meta-information associated the data packet. Further, the ship data routing module 204 may configured to route the payload associated with the data packet, from the buffer datastore to the target enterprise application 303-T running at the target ship terminal 103-T. In alternative environment, the ship data routing 204 may directly route the payload associated with the data packet, without storing in the buffer datastore, from the designated data partition 302-D at the outbound message store 305, to the target enterprise application 303-T running at the target ship terminal 103-T. The routing to the target enterprise application 303-T running at the target ship terminal 103-T, may be performed by calling configured APIs of the target enterprise applications 303-T running at the target ship terminal 103-T.

Now referring to FIG. 4, a data flow representation in the event of data exchange from a source ship terminal 103-S to the shore terminal 102, is illustrated in accordance with an embodiment of the present disclosure. The ship data routing module 204, implemented at the source ship terminal 103-S, may be configured to receive one or more data packets from the one or more enterprise applications 403-A, 403-B collectively referred to as Enterprise applications 403, running at the source ship terminal 103-S. The exchanging of data packets may be performed by calling a data transfer API associated with the ship data routing module 204. Further, the exchanging of data packets may be performed by calling the one or more APIs associated with the enterprise applications 403 running at the source ship terminal 103-S.

The data packets may comprise a payload and a meta information. The payload may correspond to actual business data which needs to be exchanged from the enterprise applications 403 running at the source ship terminal 103-S to one or more target enterprise applications running 401 running at the shore terminal 102. The meta-information may correspond to information related to a destination endpoint to which payload is going to be transferred. The information related to destination endpoint may comprise address/port information of the shore terminal 102 or of the one or more target enterprise applications 401 running on the shore terminal 102, in the case of ship to shore data exchange. Further, the meta-information may correspond to details which decides whether the data packets need to be processed sequentially or not.

Further, an inbound message store 405 may be maintained by the messaging server 105. The inbound message store 405 may be configured to maintain one or more common data partitions 404-1, 404-2 ... 404-N collectively referred to as a common data partitions 404, for storing data packets, received from the source ship terminals 103-S, related to the one or more target enterprise applications 401 running on the shore terminal 102. The one or more common data partitions 404 may be configured to store the data packets, targeted to be sent to shore terminal 102. The one or more common data partitions 404 are maintained, in the inbound message store 405 for any one of the for one or more target enterprise applications 401 running at the shore terminal 401, for managing large volume of data, diversity of data, different types of data, different topic of data or a combination thereof. The data packets, received from the one or more enterprise applications 403 running on the source ship terminal 103-S, either may be stored in a single common data partition from the one or more common data partitions 404 or may be stored in multiple common data partitions from the one or more common data partitions 404. The data packets stored in the multiple common data partitions either based on any one of the target enterprise application 401-T from the one or more target enterprise application 401, volume of data in the common data packets, diversity in the type of data, diversity in topics of data, and a combination thereof, of the data packets. In another embodiment, the data packets may be stored in the multiple common data partitions 404 for achieving any one of the better data segregation, better data manageability, parallel data processing and a combination thereof. In alternative embodiment, the messaging server 105, hosted at the shore terminal 102, may further be configured to maintain one or more data partitions (not illustrated) in the inbound message store 405. Each data partition from the one or more data partitions in the inbound message store 405 may correspond to a ship terminal from the one or more ship terminals 103. The data packets, received from the one or more enterprise applications 403 running on the source ship terminal 103-S may be stored in a data partition from the one or more data partitions (not illustrated), maintained in the inbound message store 405, corresponding to the source ship terminal 103-S from which the data packet belongs.

Further, the ship data routing module 204 may be configured to monitor a network connection between the source ship terminal 103-S and the inbound message store 405. The monitoring of network connection may be performed by polling the inbound message store 405 in a predefined time interval (for e.g., in every 5 seconds), to look for a stable connection. The ship data routing module 204 may be configured for automatically retrying for the network connection within a predefined time interval, in the event of non-availability of network connection with the inbound message store 405. Frequency of time interval and number of automatic retry either may be configurable by an administrator or may be manage by message brokers using standards-based messaging protocols including but not limited to Message Queuing Telemetry Transport (MQTT), Advanced Messaging Queuing Protocol (AMQP), Data Distribution Service (DDS), Java Message Service (JMS), XMPP, MQI, AMI or more. The ship data routing module 204 may further be configured to maintain a buffer data store (not illustrated) at the source ship terminal 103-S, to temporarily store the received data packets in the event of monitoring or non-availability of stable network connection between the source ship terminal 103-S and the inbound message store 405.

After establishing a stable network connection between the source ship terminal 103-S and the inbound message store 405, the ship data routing module 204 may further be configured to route the received data packets, intended for the shore terminal 102, either to the one or more common data partitions 404 or to the data partition (not illustrated), maintained at the inbound message store 405. The routing of data packets to the common data partition 404 or the data partition (not illustrated) maintained at the inbound message store 405, may be performed based on the meta information associated with the received data packet.

Further the shore data routing module 202, implemented at the shore terminal 102, may be configured to pull the data packets stored either in the one or more common data partitions 404 or in the one or more data partitions maintained in the inbound message store 405. Further, the shore data routing module 202 may be configured to identify, for each data packet, a target enterprise applications 401-T from the one or more target enterprise applications 401, running at the shore terminal 102, based on the meta-information associated with the data packets stored in the common data partitions 404 or the data partitions maintained in the inbound message store 405. Further, the shore data routing module 202 may be configured to push the payload associated with the data packets, pulled from the inbound message store 405, to the target enterprise applications 401-T running at the shore terminal 102. The pushing of payload to the target enterprise applications 401-T may be performed by invoking a destination endpoint API associated with the target enterprise application 401-T.

In another embodiment, seamless data exchange between the enterprise applications running at the shore terminal 102 and the enterprise applications running at the ship terminal 103, may be performed by identifying and invoking APIs related to the destination endpoint enterprise applications. Transferring of data directly using the destination endpoint API, may enables the exchange of data between same enterprise applications running at the shore terminal 102 and the ship terminal 103.

The exemplary embodiment related to exchanging data between same enterprise applications running on both shore terminal 102 and the one or more ship terminals 103 is now described. In an embodiment related to exchanging data from the shore terminal 102 to the one or more ship terminals 103, consider a Point of sale (POS) enterprise application running on five different ships for a cruise line. When an administrator wants to add a new retail item (e.g., Souvenirs) or restaurant item (e.g., a new beverage) to the POS enterprise application on all or selected ships 103, the POS enterprise application on shore terminal 102 may collate and send information to all ship POS by using the data exchange framework explained above. The framework enables benefit/advantage such as enabling central configuration mechanism, saving time and overheads for the ship administration and others. In another embodiment related to exchanging data from the one or more ship terminals 103 to the shore terminal 102, consider the same POS enterprise application mentioned above. If Sales information from each ship needs to be sent to shore terminal 102 for central reporting and analysis by the revenue accounting team, POS application on each ship can send sales information to the POS application at the shore terminal 102 by using the data exchange framework explained above, thereby enabling the revenue team to take aggregated sales reports of ships centrally.

In another embodiment, transferring of data directly using the destination endpoint API, may enable the exchange of data between different or unrelated enterprise applications running at the shore terminal 102 and the one or more ship terminals 103. The exemplary embodiment related to explained as for example.

If the cruise line intends to credit loyalty points to the guest for purchases made on the ship, a point of sale (POS) enterprise application on that ship can transfer data to a Loyalty application on the shore terminal 102. In this case, POS application needs to just provide data according to the Loyalty API specification. Specific destination API end point also may be configured on the shore terminal 102 for this transfer.

The method and system of seamless exchanging of data between enterprise applications hosted on ships and its shore counterparts, of the present subject matter offer following advantages, but are not limited to, following benefits/advantages:

Seamless transfer of transactional data between shore and ships without the overhead of error handling in network glitches for data analytics, reporting and revenue accounting use cases.

Allows stakeholders to do business configurations on a central shore instance and with enabled targeted data exchange it to respective or all ships. This substantially reduces the overhead in managing big fleets of ships by reducing complexity and human overhead. Any and all required changes can be quickly pushed across to the business fleets from a central hub. Thus, enabling flexibility and agility for the business in rolling out changes.

Easily extend businesses with seamless data exchange between ship and shore side infrastructure. For instance, allow cruise guests to make a dining or event reservations on any ship at the time of cruise bookings or during the journey. Location of access becomes irrelevant in the journey plan, giving the guest total flexibility and ease of seamless experience throughout the journey.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

Although the implementations for the seamless exchange of data between enterprise applications hosted on ships and its shore counterparts have been described in language specific to structural features and/or methods, it is to be understood that the appended claims are not necessarily limited to the specific features or methods described. Rather, the specific features and methods are disclosed as examples of implementations for the real-time exchanging of data between enterprise applications hosted on ships and its shore counterparts along with as disclosed components.

The invention claimed is:

1. A system (101) for transferring data from a shore terminal (102) to one or more ship terminals (103), the system (101) comprises:
 a memory (203);
 a processor (201) coupled to the memory (203), wherein the processor (201) is configured to execute program instructions, stored in the memory (203), wherein the program instructions are corresponding to modules (205), wherein the modules (205) comprise a shore data routing module (202) and a ship data routing module (204), wherein a messaging server (105) is hosted on the shore terminal (102), wherein the messaging server (105) comprises a message store (106), wherein the message store (106) comprises an outbound message store (305) and an inbound message store (405), wherein the processor (201) configured to execute program instructions, stored in the memory (203), corresponding to the messaging server (105), implemented at the shore terminal (102) for:
 maintaining one or more data partitions (302) in the outbound message store (305), wherein each data partition corresponds to a ship terminal from the one or more ship terminals (103);
 the processor (201) is further configured to execute program instructions, stored in the memory (203), corresponding to the shore data routing module (202), implemented at the shore terminal (102) for:
 receiving one or more packets from one or more enterprise applications (301) running at the shore terminal (102), wherein each packet, from the one or more packets, comprises a payload and a meta-information, wherein the payload corresponds to data which is to be transferred to a target ship terminal (103-T), wherein the meta-information corresponds to an address of the target ship terminal (103-T) from the one or more ship terminals (103), to which the payload is to be transmitted;
 identifying a target data partition (302-T), from the one or more data partitions (302), corresponding to each packet from the one or more packets, based on the meta-information corresponding to each packet from the one or more packets; and
 storing each packet to the target data partition (302-T) associated with the packet, in the outbound message store (305); and
 the processor (201) is further configured to execute program instructions, stored in the memory (203), corresponding to the ship data routing module (204), implemented at the target ship terminal (103-T) for:
 monitoring a network connection between the target ship terminal (103-T) and the outbound message store (305);
 identifying the target data partition (302-T), from the one or data partitions (302), associated with the target ship terminal (103-T), when a stable network connection is established between the target ship terminal (103-T) and the outbound message store (305);
 identifying a target enterprise application (303-T), from the one or more target enterprise applications (303), running on the target ship terminal (103-T), based on the meta-information associated with each packet stored in the target data partition (302-T); and
 transmitting the payload associated with each packet, stored in the target data partition (302-T), to the target enterprise application (303-T) running on the target ship terminal (103-T).

2. The system (101) as claimed in claim 1, wherein the one or more packets are received from the one or more enterprise applications (301) through a data transfer Application Programming Interface (API) associated with the shore data routing module (202).

3. The system (101) as claimed in claim 1, wherein the stable network connection between the target ship terminal (103-T) and the outbound message store (305), is monitored by polling the outbound message store (305) in a predefined time interval, wherein the predefined time interval is in the range of 5 Sec to 5 min.

4. The system (101) as claimed in claim 1, wherein one or more target Application Programming Interface (APIs) are configured for transmitting the payload, associated with the one or more packets, to the one or more target enterprise applications (303).

5. The system (101) as claimed in claim 4, wherein each target API, from the one or more target APIs, corresponds to the target enterprise application (303-T) of one or more target enterprise applications (303).

6. The system (101) as claimed in claim 1 is further configured for receiving one or more common data packets from the one or more enterprise applications (301), wherein each common data packet from the one or more common data packets corresponds to two or more ship terminals, from the one or more ship terminals (103), to which the common data packet is to be transferred.

7. The system (101) as claimed in claim 1, wherein the outbound message store (305) further maintains one or more common data partitions (304).

8. The system (101) as claimed in claim 7, wherein the one or more common data partitions (304) are configured to store the one or more common data packets.

9. A method for transferring data from a shore terminal (102) to one or more ship terminals (103), the method comprises steps of:
maintaining one or more data partitions (302) in an outbound message store (305), wherein each data partition corresponds to a ship terminal from the one or more ship terminals (103);
receiving one or more packets from one or more enterprise applications (301) running at the shore terminal (302), wherein each packet, from the one or more packets, comprises a payload and a meta-information, wherein the payload corresponds to data which is to be transferred to a target ship terminal (103-T), wherein the meta-information corresponds to an address of the target ship terminal (103-T), from the one or more ship terminals (103), to which the payload is to be transmitted;
identifying a target data partition (302-T), from the one or more data partitions (302), corresponding to each packet from the one or more packets, based on the meta-information corresponding to each packet from the one or more packets;
storing each packet to the target data partition (302-T) associated with the packet, in the outbound message store (305);
monitoring a network connection between the target ship terminal (103-T) and the outbound message store (305);
identifying the target data partition (302-T), from the one or data partitions (302), associated with the target ship terminal (103-T), when a stable network connection is established between the target ship terminal (103-T) and the outbound message store (305); and
transmitting the payload associated with each packet, stored in the target data partition (302-T), to the target enterprise application (303-T), running on the target ship terminal (103-T).

10. The method as claimed in claim 9, wherein the one or more packets are received from the one or more enterprise applications (301) through a data transfer Application Programming Interface (API) associated with the shore data routing module (202).

11. The method as claimed in claim 9, wherein the stable network connection between the target ship terminal (103-T) and the outbound message store (305), is monitored by polling the outbound message store (305) in a predefined time interval, wherein the predefined time interval is in the range of 5 Sec to 5 min.

12. The method as claimed in claim 9, wherein one or more target Application Programming Interface (APIs) are configured for transmitting the payload, associated with the one or more packets, to the one or more target enterprise applications (303).

13. The method as claimed in claim 12, wherein each target API, from the one or more target APIs, corresponds to a target enterprise application (303-T) of one or more target enterprise applications (303).

14. The method as claimed in claim 9 is further configured for receiving one or more common data packets from the one or more enterprise applications (301), wherein each common data packet from the one or more common data packets corresponds to two or more ship terminals, from the one or more ship terminals (103), to which the common data packet is to be transferred.

15. The method as claimed in claim 9, wherein the outbound message store (305) further maintains one or more common data partitions (304).

16. The method as claimed in claim 15, wherein the one or more common data partitions (304) are configured to store the one or more common data packets.

17. A system (101) for transferring data from a source ship terminal (103-S) to a shore terminal (102), the system comprises:
a memory (203); and
a processor (201) coupled to the memory (203), wherein the processor (201) is configured to execute program instructions stored in the memory (203), wherein the program instructions are corresponding to modules (205), wherein the modules (205) comprise a shore data routing module (202) and a ship data routing module (204), wherein a messaging server (105) hosted on the shore terminal (102), wherein the messaging server (105) comprises a message store (106), wherein the message store (106) comprise an outbound message store (305) and an inbound message store (405), wherein the processor (201) configured to execute program instructions, stored in the memory (203), corresponding to the messaging server (105), implemented at the shore terminal (102) for:
maintaining one or more common data partitions (404) in the inbound message store (405);
the processor (201) configured to execute program instructions, stored in the memory (203), corresponding to the ship data routing module (204), implemented at the source ship terminal (103-S) for:
receiving one or more data packets from one or more enterprise applications (403) running at the source ship terminal (103-S), wherein each data packet, from the one or more data packets, comprises a payload and a meta-information, wherein the payload corresponds to data which is to be transferred to the shore terminal (102), wherein the meta-information corresponds to address of one or more target enterprise applications (401) running at the shore terminal (102), to which payload is to be transmitted;
monitoring a network connection between the source ship terminal (103-S) and the inbound message store (405), hosted at the shore terminal (102); and
storing the one or more data packets, to the one or more common data partitions (404) in the inbound message store (405), when the network connection between the source ship terminal (103-S) and the inbound message store (405) is stable;

the processor (201) configured to execute program instructions, stored in the memory (203), corresponding to the shore data routing module (202), implemented at the shore terminal (102) for:

identifying a designated common data partition (404-D) from the one or more common data partitions (404), corresponding to each data packet, from the one or more data packets;

identifying a target enterprise application (401-T) from the one or more target enterprise applications (401), corresponding to each data packet, from the one or more data packets, based on meta-information associated with each packet from the one or more data packets; and transmitting, from the designated common data partition (404-D), the payload associated with each data packet from the one or more data packets to the target enterprise application (401-T) running at the shore terminal (102).

18. The system (101) as claimed in claim 17, wherein the one or more data packets are received from the one or more enterprise applications (403) through one or more data transfer Application Programming Interface (APIs), wherein each data transfer API, from the one or more data transfer APIs, corresponds to an enterprise application from the one or more enterprise applications (403).

19. The system (101) as claimed in claim 17, wherein the stable network connection between the source ship terminal (103-S) and the inbound message store (405) is monitored by polling the inbound message store (405) in a predefined time interval, wherein the predefined time interval is in the range of 5 Sec to 5 min.

20. The system (101) as claimed in claim 17 further configured to maintains a buffer datastore at the source ship terminal (103-S), wherein the buffer datastore is configured to temporarily store the one or more data packets received from the one or more enterprise applications (403).

21. The system (101) as claimed in claim 17, wherein one or more target Application Programming Interface (APIs) are configured for transmitting the payload, associated with the one or more data packets, to the one or more target enterprise applications (401).

22. The system (101) as claimed in claim 21, wherein each target API, from the one or more target APIs, corresponds to a target enterprise application (401-T) of one or more target enterprise applications (401) running at the shore terminal (102).

23. A method for transferring data from a source ship terminal (103-S) to a shore terminal (102), the method comprises steps of:

maintaining one or more common data partitions (404) in an inbound message store (405);

receiving one or more data packets from one or more enterprise applications (403) running at the source ship terminal (103-S), wherein each data packet, from the one or more data packets, comprises a payload and a meta-information, wherein the payload corresponds to data which is to be transferred to the shore terminal (102), wherein the meta-information corresponds to address of one or more target enterprise applications (401) running at the shore terminal (102), to which payload is to be transmitted;

monitoring a network connection between the source ship terminal (103-S) and the inbound message store (405), hosted at the shore terminal (102);

storing the one or more data packets, to the one or more common data partitions (404) in the inbound message store (405), when the network connection between the source ship terminal (103-S) and the inbound message store (405) is stable;

identifying a designated common data partition (404-D) from the one or more common data partitions (404), corresponding to each data packet from the one or more data packets;

identifying a target enterprise application (401-T), from the one or more target enterprise applications (401), corresponding to each data packet, from the one or more data packets, based on meta-information associated with each packet from the one or more data packets; and transmitting, from the designated common data partition (404-D), the payload associated with each data packet from the one or more data packets to the target enterprise application (401-T) running at the shore terminal (102).

24. The method as claimed in claim 23, wherein the one or more data packets are received from the one or more enterprise applications (403) through one or more data transfer Application Programming Interface (APIs), wherein each data transfer API, from the one or more data transfer APIs, corresponds to an enterprise application from the one or more enterprise applications (403).

25. The method as claimed in claim 23, wherein the stable network connection between the source ship terminal (102-S) and the inbound message store (405) is monitored by polling the inbound message store (405) in a predefined time interval, wherein the predefined time interval is in the range of 5 Sec to 5 min.

26. The method as claimed in claim 23 further configured to maintains a buffer datastore at the source ship terminal (103-S), wherein the buffer datastore is configured to temporarily store the one or more data packets received from the one or more enterprise applications (403).

27. The method as claimed in claim 23, wherein one or more target Application Programming Interface (APIs) are configured for transmitting the payload, associated with the one or more data packets, to the one or more target enterprise applications (401).

28. The method as claimed in claim 27, wherein each target API, from the one or more target APIs, corresponds to a target enterprise application (401-T) of one or more target enterprise applications (401) running at the shore terminal (102).

* * * * *